United States Patent Office 2,711,400
Patented June 21, 1955

2,711,400
PREPARATION OF MIXTURES OF RUBBERY BUTADIENE STYRENE COPOLYMER WITH RESINOUS POLYMER OF VINYL OR VINYLIDENE CHLORIDE

Stuart A. Harrison, Stow, Ohio, and Walter E. Brown, Cambridge, Mass., assignors to The B. F. Goodrich Company, New York, N. Y., a corporation of New York No Drawing. Original application May 23, 1946, Serial No. 671,897, now Patent No. 2,614,089, dated October 14, 1952. Divided and this application January 5, 1952, Serial No. 272,503

4 Claims. (Cl. 260—45.5)

This invention relates to synthetic polymeric materials and to a method of preparing the same, and is especially concerned with the preparation of polymeric materials in which a rubbery copolymer of a butadiene-1,3 hydrocarbon and another polymerizable compound such as styrene is uniformly and intimately combined with a hard resinous saturated polymer of a chloroethylene containing from one to two chlorine atoms on one only of the carbon atoms, that is, vinyl or vinylidene chloride.

Rubbery copolymers of a butadiene-1,3 hydrocarbon with styrene or its equivalents constitute a well known class of materials. Such materials (often called "butadiene styrene synthetic rubber") are characterized chemically by possessing long carbon chains containing a multiplicity of intra-chain carbon to carbon double bonds, that is, they are high molecular weight (a molecular weight generally above 50,000) linear polymers with a high degree of aliphatic unsaturation (iodine numbers generally above about 50); and are characterized physically by a resemblance to natural rubber in that they are capable of being converted from an essentially plastic workable condition to a highly elastic condition by vulcanization, as by heating with sulfur.

Although such butadiene styrene synthetic rubbers resemble natural rubber in many respects and are even superior thereto in certain respects, they also possess an outstanding disadvantage as compared to natural rubber. This disadvantage resides in the fact that they are generally much weaker and much less elastic when vulcanized in a "pure gum" recipe (that is, a recipe which includes the rubbery material and vulcanizing ingredients but is free from significant amounts of other compounding ingredients such as pigments, fillers, softeners, etc.) than is natural rubber. For example, "pure gum" vulcanizates of natural rubber possess a tensile strength ranging from 2,000 to 3,000 lbs./sq. in. or more and are highly elastic, whereas "pure gum" vulcanizates of such synthetic rubbers possess tensile strengths generally less than 1,000 lbs./sq. in., and often as low as 200 to 500 lbs./sq. in., and are not nearly so elastic. As a result, such synthetic rubbers must be compounded with carbon black (which remarkably reinforces the synthetic rubber, to an extent even greater than it does with natural rubber) to attain sufficient strength to be useful, even though this is undesirable in many instances because of the black coloration and the increased stiffness of the composition.

Another class of polymeric materials, quite different in properties from the rubbery butadiene-1,3 styrene copolymers, are the hard, solid, resinous, saturated polymers of vinyl chloride or vinylidene chloride. These materials are also high molecular weight polymers (molecular weight generally above 50,000) containing long carbon chains, but they differ from the rubbery copolymers in that these chains are substantially saturated (the double bonds of the monomer disappearing on polymerization), and as a result the polymer possesses an iodine number of zero or thereabouts. In physical properties these materials also differ from rubbery materials since they are hard and stiff at ordinary temperatures (having a Brinell hardness number in the unplasticized condition within the range of about 10 to 50 as measured on the Brinell apparatus using a 2.5 mm. ball with a 25 kg. load); they are not appreciably elastic unless mixed with plasticizers; and they are not vulcanizable in the manner of natural rubber. Moreover, they are thermoplastic whereas the rubbery copolymers stiffen at elevated temperatures.

It has heretofore been proposed to form blends of certain of the rubbery copolymers of the first of the above-described classes with certain of the hard saturated vinyl or vinylidene chloride resins of the second of the above-described classes by mixing the materials on a mill or in an internal mixer, but this practice has met with little success. Thus, in many instances the materials are not compatible with or soluble in one another, and as a result the blend obtained is weaker and less desirable than either of the materials alone.

One of the principal objects of this invention is to provide a method whereby rubbery butadiene-1,3 styrene copolymers and hard saturated vinyl or vinylidene chloride resinous polymers may be intimately combined with one another.

A second principal object is to provide a new class of synthetic polymeric materials, which are rubbery and vulcanizable in nature, and which resemble natural rubber, rather than butadiene styrene synthetic rubber, in that they may be vulcanized in a "pure gum" recipe to produce strong snappy vulcanizates having a tensile strength above 1,000 lbs./sq. in., yet are far superior to natural rubber in resistance to oxidation, to chemicals and to other deteriorating influences.

Numerous other objects will be apparent hereinafter.

The first of the principal objects is attained by the method of this invention, which method comprises the steps of emulsifying a monomeric mixture polymerizable in aqueous emulsion to form an unsaturated rubbery copolymer, and comprising a butadiene-1,3 hydrocarbon and a copolymerizable compound such as styrene, in an aqueous emulsifying medium containing dispersed solid particles of a hard saturated resinous polymer of vinyl or vinylidene chloride, and then polymerizing the said monomeric material while so emulsified. A most convenient way of proceeding is to polymerize the mixture of butadiene-1,3 hydrocarbon and copolymerizable compound in aqueous emulsion in the usual manner except that the polymerization is carried out in the presence of a previously prepared aqueous dispersion or latex of the saturated vinyl or vinylidene chloride resin. When practicing this method (sometimes referred to hereinafter for sake of brevity as "seeding" the emulsion copolymerization forming a butadiene styrene copolymer with hard saturated vinyl or vinylidene chloride resinous polymer), it has been found that formation of rubbery copolymer occurs on the surfaces of the particles of saturated resinous polymer to produce an aqueous dispersion in which the rubbery copolymer and the saturated resin are present in the same individual particles. As a result, coagulation of the dispersion produces a polymeric material in which the rubbery copolymer and the saturated resin are uniformly and intimately combined, regardless of whether they are soluble in one another.

When the hard saturated resin is present in a proportion less than that of the rubbery copolymer, the second of the above-stated objects is attained. For in this instance it has been found that the aqueous dispersion obtained by the polymerization consists of particles containing a core of the hard saturated vinyl or vinylidene chloride resin surrounded by a covering of vulcanizable rubbery copolymer, and that coagulation of this dispersion yields a rubbery vulcanizable polymeric material comprising small discrete particles of hard saturated resin evenly and intimately dispersed or embedded in a continuous phase of the rubbery copolymer. Such copolymeric materials closely resemble natural rubber in that they are strong and elastic, yet soft and flexible, when vulcanized in a "pure gum" recipe. They are quite useful in the production of many articles customarily made from "pure gum" rubber compounds such as nursing nipples, rubber thread, stationers' bands, surgical goods, etc., which are superior to those made from butadiene styrene synthetic rubber because of a much greater strength and elasticity and are superior to those made from natural rubber because of a greater resistance to various deteriorating influences. Additionally, these polymeric materials may be compounded with fillers, pigments, etc. and vulcanized to produce improved compositions useful for the same multifarious purposes as are other rubbery materials, such compounded materials being particularly useful for applications where it is undesirable to use carbon black as in producing white and brightly colored compositions and in electrical insulation.

The practice of the invention in preferred embodiments may be illustrated by the following specific examples in which all parts are by weight.

EXAMPLES 1 TO 4

*Seeding emulsion copolymerization of butadiene-1,3 and styrene with latex of polyvinyl chloride*

In these examples a mixture of butadiene-1,3 and styrene (which is polymerizable to form a rubbery copolymer) is emulsified in an aqueous emulsifying medium containing varying amounts of dispersed, finely-divided particles of polyvinyl chloride (which is a hard, saturated resinous polymer insoluble in the rubbery butadiene-1,3 styrene copolymer) and is then polymerized while so emulsified. The precise procedure utilized is as follows:

A polyvinyl chloride latex containing about 19.5% by weight of dispersed polyvinyl chloride in the form of particles of an average diameter of about 0.03 micron is prepared by polymerizing 100 parts of vinyl chloride in an aqueous emulsion containing 150 parts of water, 4 parts of fatty acid soap as emulsifying agent, 0.45 part of potassium persulfate as polymerization catalyst, and 0.3 part of 28% ammonium hydroxide as a buffer, at a temperature of 50° C. for about 20 hrs. (about 95% of the vinyl chloride then being converted to polymer), and then diluting the resulting latex to a total solids concentration of about 20%. Varying amounts of this polyvinyl chloride latex are then mixed with 90 parts of monomeric butadiene-1,3, 30 parts of monomeric styrene, 2.4 parts of fatty acid soap, 0.36 part of potassium persulfate, 0.54 part of n-dodecyl mercaptan as a polymerization modifier, and sufficient water to make a total of about 300 parts, to form emulsions of the monomeric material, which is then polymerized by agitating the emulsions at 50° C. for about 20 hours, after which time about 80% of the monomers are polymerized. The products consist of aqueous dispersions containing finely-divided particles of polymeric material, which on examination with the electron microscope are found to consist of a core of polyvinyl chloride surrounded by a covering of rubbery butadiene-1,3 styrene copolymer. The dispersions are then coagulated by addition of acid and the polymeric materials washed and dried.

The polymeric materials are then compounded in a "pure gum" recipe with 10 parts of litharge, 5 parts of zinc oxide, 5 parts of coal tar and 2 parts of sulfur for each 100 parts of butadiene styrene copolymer present and are then vulcanized by heating at 307° F. for 45 minutes.

The following table shows the parts of polyvinyl chloride present for each 100 parts of rubbery butadiene-1,3 styrene copolymer in the polymeric materials, and the tensile strength, ultimate elongation and modulus of elasticity at 300% elongation of the vulcanizates. Data on a butadiene-1,3 styrene copolymer prepared in the same way except that no polyvinyl chloride latex was used is also included for comparison.

|  | Parts Polyvinyl Chloride per 100 parts Butadiene-1,3 Styrene Copolymer | Tensile Strength, lbs./sq. in. | Ultimate Elongation (percent) | Modulus at 300%, lbs./sq. in. |
| --- | --- | --- | --- | --- |
| Control | 0 | 250 | 300 | 250 |
| Example 1 | 9.5 | 875 | 510 | 115 |
| Example 2 | 18.2 | 1,200 | 840 | 275 |
| Example 3 | 27.3 | 1,150 | 740 | 360 |
| Example 4 | 36.4 | 1,200 | 690 | 610 |

It is apparent that the polymeric materials containing polyvinyl chloride are far superior to the control in tensile strength and elasticity and that these improvements are secured without appreciable stiffening of the vulcanizate. These "pure gum" vulcanizates are thus more like natural rubber "pure gum" vulcanizates in physical properties. These improvements are not secured however when it is attempted to mix polyvinyl chloride and the butadiene-1,3 styrene copolymer on a mixing mill or by other conventional methods.

EXAMPLES 5 AND 6

*Seeding emulsion copolymerization of butadiene-1,3 and styrene with latex of polyvinylidene chloride*

The procedure of the preceding examples is repeated except that various proportions of a polyvinylidene chloride latex containing about 15% by weight of polyvinylidene chloride in the form of small particles of about 0.04 micron in average diameter, and prepared by the polymerization at 50° C. of 75 parts of vinylidene chloride in an aqueous emulsion containing 367 parts of a 2% aqueous soap solution and 0.45 part of potassium persulfate, are used in place of the polyvinyl chloride latex. The amount of polyvinylidene chloride present for each 100 parts of the butadiene styrene copolymer formed by the polymerization, and the physical properties of the polymeric materials obtained when vulcanized in the "pure gum" recipe set forth in the preceding examples, are as follows:

|  | Parts Polyvinylidene Chloride per 100 parts Butadiene-1,3 Styrene Copolymer | Tensile Strength, lbs./sq. in. | Ultimate Elongation (percent) | Modulus at 300%, lbs./sq. in. |
| --- | --- | --- | --- | --- |
| Control |  | 250 | 300 | 250 |
| Example 5 | 37.6 | 1,100 | 840 | 275 |
| Example 6 | 51.4 | 1,200 | 640 | 350 |

It is again apparent that the presence of hard saturated resin (polyvinylidene chloride in this instance) increases the tensile strength and elasticity of the "pure gum" vulcanizate without greatly affecting the modulus. As in the case of polyvinyl chloride, this improvement is not secured when it is attempted to mill mix the polyvinylidene chloride and the rubbery copolymer, which are not compatible with one another.

Substantially equivalent results are secured when using in place of polyvinyl chloride or polyvinylidene chloride, other hard saturated resins prepared by the polymerization of a monomeric mixture consisting predominantly of vinyl chloride or vinylidene chloride such as the copolymers of vinyl chloride and vinylidene chloride and the copolymers of either of these with other monomers containing a single olefinic double bond such as ethyl acrylate, butyl acrylate, methyl methacrylate, acrylonitrile, diethyl maleate and the like.

In the examples the monomeric mixture of butadiene-1,3 hydrocarbon and copolymerizable compound which is polymerized to form a rubbery copolymer, has been a mixture of butadiene-1,3 and styrene. Various other mixtures are substantially equivalent in this respect to the specific mixtures used and may be substituted therefor. For example, there may be used mixtures containing a predominant amount of any butadiene-1,3 hydrocarbons such as butadiene-1,3, isoprene, 2,3-dimethyl butadiene-1,3 or piperylene or a combination of two or more of these and a lesser amount of one or more of the following monomers: styrene, alpha-methyl styrene, p-methoxy styrene, p-chloro styrene, dichloro styrene, vinyl naphthalene and other alkenyl substituted aromatic compounds of the formula

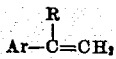

wherein Ar is an aromatic radical having its connecting valence on a ring carbon atom and R is hydrogen or alkyl.

It is preferred that the saturated vinyl or vinylidene chloride resin be prepared by polymerization in aqueous emulsion and that the dispersion or latex obtained be utilized to supply the resin, and it is also preferred that the particles of resin in the latex be no greater than about 0.4 micron in average diameter, and more preferably less than about 0.1 micron in average diameter, but other procedures for supplying the resin in dispersed form are also included. It is also preferred that the resin possess a Brinell hardness number within the range of about 10 to 50 when measured on the Brinell apparatus using a 2.5 mm. ball with a 25 kg. load, as do the resins used in the specific examples.

The precise proportion of hard saturated vinyl or vinylidene chloride resin employed in producing the polymeric products of the invention may be varied throughout the range of 1 to 100 parts of resin for each 100 parts of rubbery copolymer produced in the polymerization, and in each instance a rubbery vulcanizable polymeric material of considerably higher tensile strength than the rubbery copolymer alone is obtained. However, polymeric materials most useful for most purposes are secured when the proportion of hard saturated resin is from about 5 to 80 parts, more preferably from about 15 to 60 parts, to each 100 parts of rubbery copolymer, since such polymeric materials when vulcanized give strong snappy "pure gum" vulcanizates resembling those obtainable from natural rubber. When the proportion of resin is increased to about 80 to 100 parts for each 100 parts of rubbery copolymer, the polymeric materials are still capable of vulcanization but are somewhat stiffer and more like leather when vulcanized.

In addition to the above-discussed modifications and variations in the nature and proportions of essential materials used in practicing the invention, other modifications and variations from the specific examples are also possible. Thus, in polymerizing the monomer mixture containing butadiene-1,3 hydrocarbon and styrene in aqueous emulsion in the presence of a dispersion of the resin, use may be made of any of the various emulsifying agents, polymerization catalysts, polymerization modifiers, etc. commonly employed in the polymerization of butadiene-1,3 hydrocarbon containing mixtures in aqueous emulsion. The conditions of polymerization such as time and temperature and degree of agitation may also be varied in accordance with established procedures. Similar variations may be made in the polymerization to form the hard saturated resin if it is formed by previous polymerization in aqueous emulsion.

The products of the polymerizations described are first obtained in the form of an aqueous dispersion or latex. These latices may be used as such or they may be coagulated by any of the methods well known to the art, to yield the polymeric product in solid form. At this stage, the polymeric products of this invention comprise a continuous phase of rubbery copolymer in which there is dispersed small discrete particles of hard saturated resin. Compounding ingredients such as softeners, plasticizers, pigments, fillers, colors, stabilizing agents, antioxidants, vulcanizing ingredients, etc. may be added to the dispersion before coagulation or to the solid polymeric products after coagulation in the manner well known to the art, if desired, it being understood that the presence or absence of such materials will depend primarily upon the use to be made of the finished product and is in no way critical in this invention.

It will be apparent from the above description that the invention is not limited to the specific embodiments set forth, but only as required by the spirit and scope of the appended claims.

This application is a division of copending application Serial No. 671,897 filed May 23, 1946, now 2,614,089.

We claim:

1. The method of producing rubbery vulcanizable polymeric materials consisting of rubbery material reinforced solely by organic resinous material, which consists in polymerizing a monomer mixture polymerizable to form an unsaturated rubbery copolymer and containing from about 50 to 90% by weight of butadiene-1,3 and the remainder of styrene, in an aqueous emulsion in the presence of a previously prepared aqueous dispersion comprising particles below 0.4 micron in average diameter of a hard saturated resinous polymer of a monomeric material consisting predominantly of vinyl chloride, the said saturated resinous polymer being insoluble in the said rubbery copolymer and being the sole solid material present at the beginning of the polymerization, said saturated resinous polymer also being present in an amount from 5 to 100% by weight of that of the rubbery copolymer formed by the polymerization, and then coagulating the aqueous dispersion thereby obtained.

2. The method of producing rubbery vulcanizable polymeric materials consisting of rubbery material reinforced solely by organic resinous material, which consists in polymerizing a monomer mixture polymerizable to form an unsaturated rubbery copolymer and containing from about 50 to 90% by weight of butadiene-1,3 and the remainder of styrene, in an aqueous emulsion in the presence of a previously prepared aqueous dispersion comprising particles below 0.4 micron in average diameter of hard, saturated polyvinyl chloride resin, the proportion of the said saturated resin being insoluble in the said rubbery copolymer and being the sole solid material present at the beginning of the polymerization, said saturated resinous polymer also being from about 15 to 60% by weight of the rubbery copolymer formed by the polymerization, and then coagulating the aqueous dispersion thereby obtained.

3. The method of producing rubbery vulcanizable polymeric materials consisting of rubbery material reinforced solely by organic resinous material, which consists in polymerizing a monomer mixture polymerizable to form an unsaturated rubbery copolymer and containing from about 50 to 90% by weight of a butadiene-1,3 hydrocarbon and the remainder of an alkenyl substituted aromatic compound of the formula

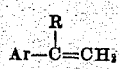

wherein Ar is an aromatic radical having its connecting valence on a ring carbon atom and R is selected from the class consisting of hydrogen and alkyl, in an aqueous emulsion in the presence of a previously prepared aqueous dispersion comprising particles below 0.4 micron in average diameter of hard saturated resinous polymer of a chloroethylene containing from 1 to 2 chlorine atoms on one only of the carbon atoms, the said saturated resinous polymer being insoluble in the said rubbery copolymer and being the sole solid material present at the beginning of the polymerization, said saturated resinous polymer also being present in an amount from 5 to 100% by weight of that of the rubbery copolymer formed by the polymerization, and then coagulating the aqueous dispersion thereby obtained.

4. The method of producing rubbery vulcanizable polymeric materials consisting of rubbery material reinforced solely by organic resinous material, which consists in polymerizing a monomer mixture polymerizable to form an unsaturated rubbery copolymer and containing from about 50 to 90% by weight of butadiene-1,3 and the remainder of styrene in an aqueous emulsion in the presence of a previously prepared aqueous dispersion comprising particles below 0.4 micron in average diameter of hard saturated polyvinylidene chloride resin insoluble in the said rubbery copolymer, the said resin being the sole solid material present at the beginning of the polymerization and being present in an amount from about 15 to 60% by weight of the rubbery copolymer formed by the polymerization, and then coagulating the aqueous dispersion thereby obtained.

References Cited in the file of this patent

UNITED STATES PATENTS 2,512,697     Grotenhuis _____ June 27, 1950